United States Patent

[11] 3,628,376

[72] Inventors Robert L. Dega
Mount Clemens;
Donald J. Mandley, Washington, both of Mich.
[21] Appl. No. 27,601
[22] Filed Apr. 13, 1970
[45] Patented Dec. 21, 1971
[73] Assignee General Motors Corporation
Detroit, Mich.

[54] O-RING TEST INSTRUMENT
2 Claims, 4 Drawing Figs.

[52] U.S. Cl. .................................................. 73/89,
73/78, 73/144, 33/172 E
[51] Int. Cl. .................................................. G01b 5/30
[50] Field of Search .......................................... 73/88, 89,
100, 120, 144, 94, 78, 81; 33/172 E

[56] References Cited
UNITED STATES PATENTS
3,194,061 7/1965 Sorenson et al. .............. 73/81

| 3,447,361 | 6/1969 | Schmitt | 73/88 |
| 3,111,840 | 11/1963 | Barnet et al. | 73/89 |
| 1,816,532 | 7/1931 | Holloway | 73/120 |

Primary Examiner—Richard C. Queisser
Assistant Examiner—Marvin Smollar
Attorneys—J. L. Carpenter, E. J. Biskup and P. D. Sachtjen ABSTRACT: A test instrument for determining processing and manufacturing uniformity in molded elastomeric articles such as O-rings wherein the O-ring is flexed between two power driven rollers while being loaded at a predetermined deflection by a third roller connected to a load-sensing element. The output of the sensing element is directed to an instrumentation device which records the stress level about the circumference of the O-ring the output variations being indications of internal discontinuities and manufacturing defects in the tested article.

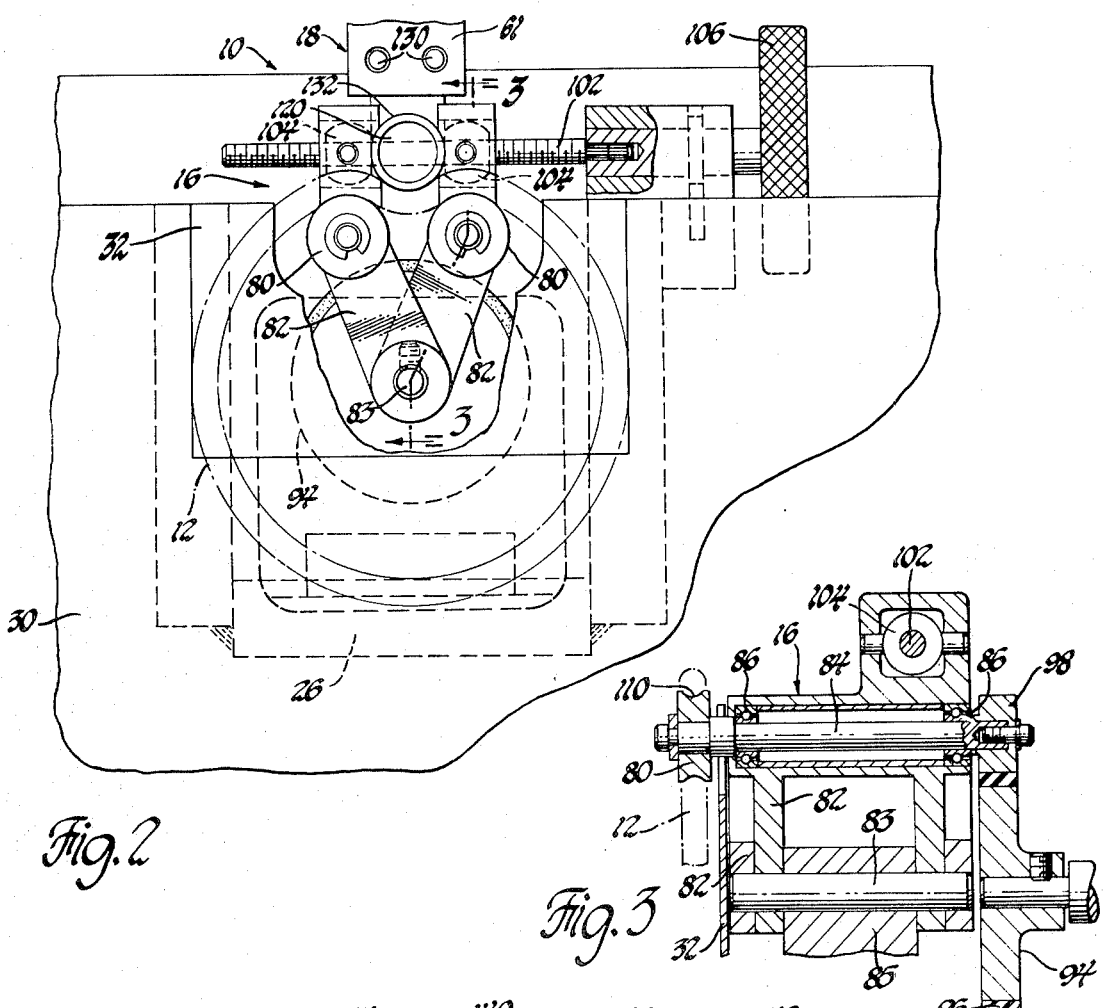
Fig. 2
Fig. 3
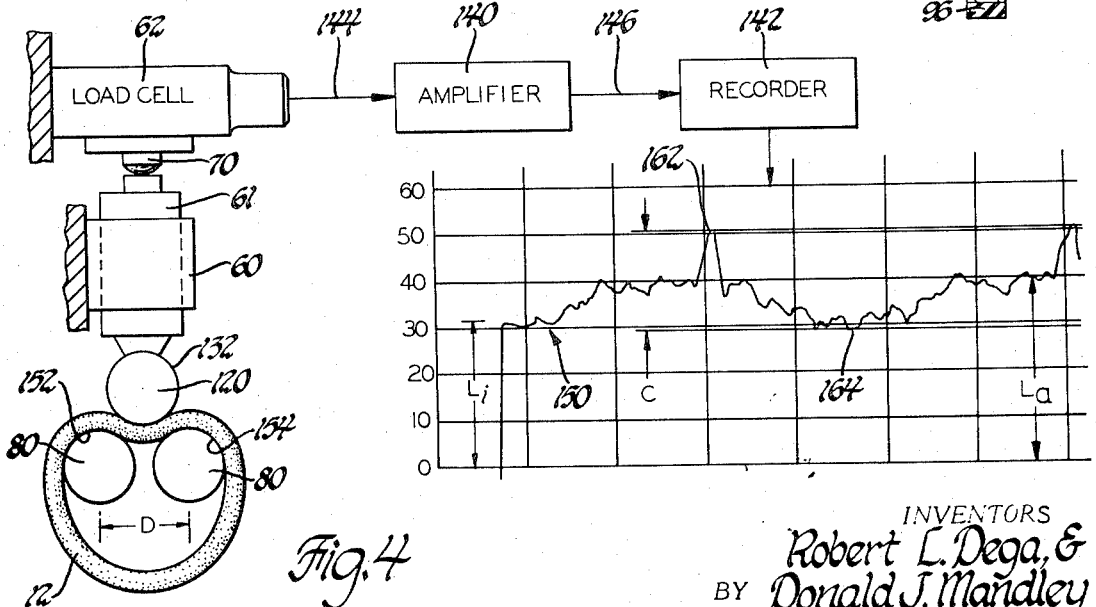
Fig. 4
INVENTORS
Robert L. Dega, &
BY Donald J. Mandley
Peter D. Sachtjen
ATTORNEY

O-RING TEST INSTRUMENT

The present invention relates to testing devices for determining product acceptability in continuous elastomeric articles and, in particular, to a device for determining processing and manufacturing uniformity in O-ring type seals.

The static and dynamic performance of annular elastomeric seals is known to be directly related to the cross-sectional uniformity of the molded article. Defects associated with the manufacturing process can produce section modulus variations which create premature dynamic deterioration of the article due to localized stress concentrations. Such irregularities can generally be grouped in two categories: internal discontinuities, such as, entrapped gas, precured material, foreign material, and molding pressures; and surface defects, such as, knit lines or surface indentations and surface cracks.

Inasmuch as the performance of these seals oftentimes is critically important to the effectiveness of expensive equipment, satisfactory procedures for determining the aforementioned problems are of considerable concern in the art. Prior testing methods were generally directed to obtaining a single overall stress-strain measurement under somewhat arbitrary testing conditions wherein the elastomeric article was statically loaded at ultimate values ranging around 100 to 300 percent elongation. While testing at such extremes can give a general indication of the seal performance, minute defects which can create equally troublesome failures are not detected. In other word, manufacturing irregularities which are randomly circumferentially distributed, such as entrapped material or gas and the like are not likely to be discovered. However, these defects constitute a significant cause of unsatisfactory seal performance inasmuch as they create localized high-stress concentrations and lead to cracking fatigue failure of the seal. Also, many other variables are not detectable under static test conditions but are of prime importance in determining the operating quality of the seal under dynamic conditions.

The present invention incorporates many features and structural advantages which enable a complete evaluation of the processing and manufacturing uniformity in O-ring type seals under dynamic as well as static conditions. Moreover, the present testing device operates at low-stress levels, does not involve the destructive testing of the above-described methods, and is readily adaptable to 100 percent quality control evaluation. The subject device is capable of determining circumferential stress changes within an elastomeric seal as related to the entire process of manufacturing and, in this manner, can fully evaluate all defects.

These features and advantages are accomplished by a seal test instrument which dynamically measures the circumferential variations in stress levels in the seal under predetermined loading conditions. More specifically, the seal to be tested is loaded between two power driven rollers while being deflected to a predetermined amount by a third element connected to a load-sensing device. By means of suitable instrumentation, such as a chart recorder, the variations in the stress level about the circumference of the seal are visually recorded, thereby permitting instant appraisal of the seal's acceptability for usage. In order to give an output which does not obscure manufacturing irregularities and a reading meaningfully related to the seal's intended usage, the gaging length between the rollers and the amount of deflection are adjustable to accommodate a broad range of seal sizes.

These and other objects will be apparent to one skilled in the art upon reading the following detailed description, reference being made to the accompanying drawings in which:

FIG. 2 is an enlarged partially sectioned view taken along line 2—2 of FIG. 1;

FIG. 3 is a view taken along line 3—3 of FIG. 2; and

FIG. 4 is a schematic view of the present device including the instrumentation.

Figure 1:
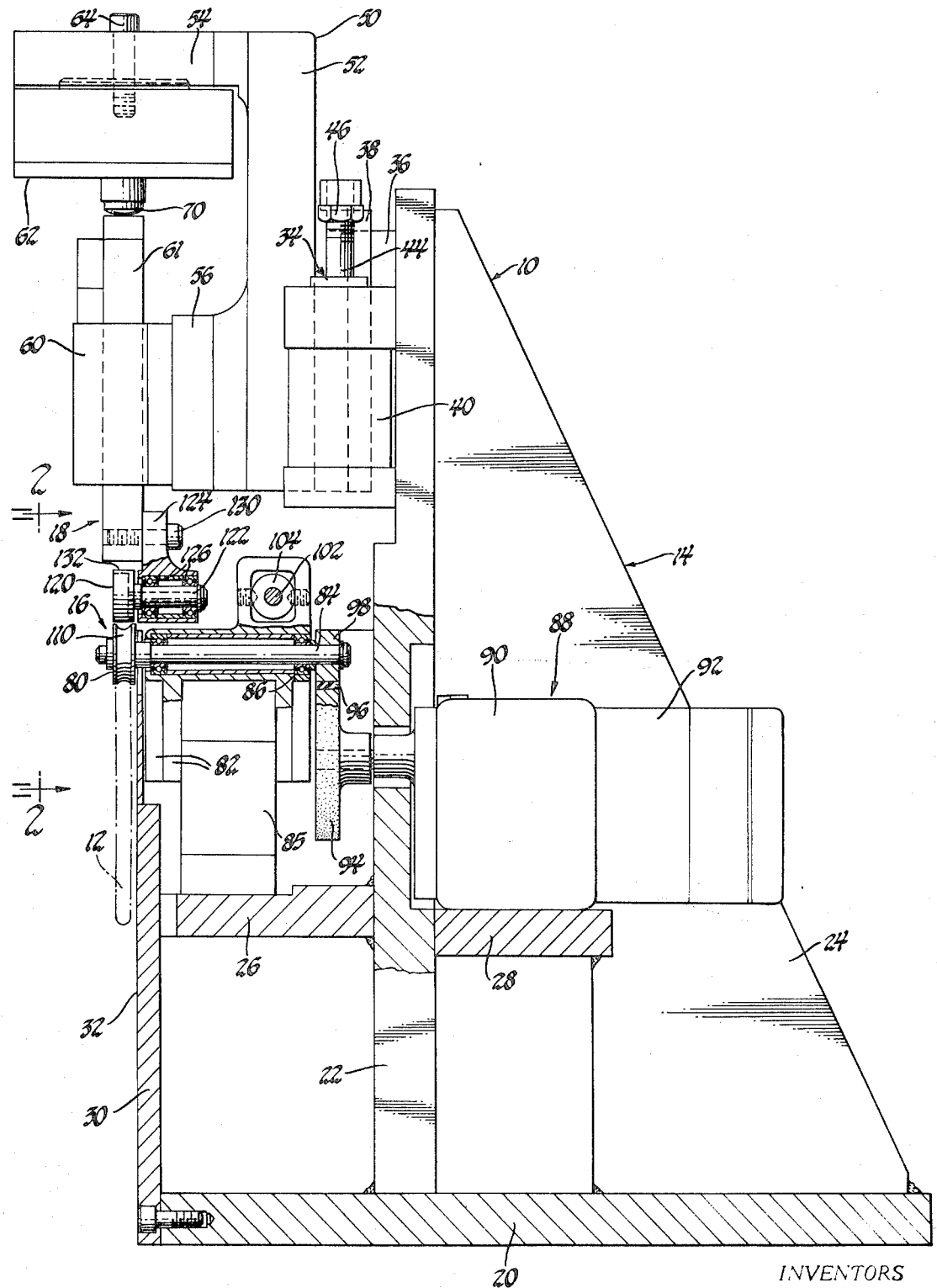
FIG. 1 is a partially sectioned side view of a seal test instrument, made in accordance with the present invention.

Referring to FIG. 1, a test instrument 10, made in accordance with the present invention, is used for determining the processing and manufacturing uniformity of continuous elastomeric articles such as fluid seals and, in particular, an O-ring 12 having a substantially circular cross section. Generally, the test instrument 10 comprises a support stand 14, a loading assembly 16, and a test head 18. The support stand 14 includes a baseplate 20 which may be horizontally or vertically mounted on a suitable support surface, a vertical mounting plate 22, and a triangular reinforcing plate 24. A pair of horizontal mounting brackets 26 and 28 are attached to the mounting plate 22. A work plate 30 having a test surface 32 is attached to the front surface of the baseplate 20 and the mounting bracket 26. A conventional machine slide 34 is used to accommodate controlled relative movement between the test head 18 and the support stand 14. The machine slide 34 includes a fixed slide 36 attached to the upper end of the mounting plate 22 and a movable slide 38 to which the test head 18 is attached. A double-acting air cylinder 40 having a piston rod 44 is used to effect reciprocative movement between the support stand 14 and the test head 18. The retracted position of the test head 18, as shifted by the air cylinder 40, is adjustably controlled by an adjusting nut 46 connected between the movable slide 38 and the piston rod 44.

The test head 18 includes a generally C-shaped mounting bracket 50 having a vertical side arm 52 connected to the movable slide 38 and forwardly projecting upper and lower arms 54 and 56. An air-lubricated slide assembly 60 including a slide bar 61 is connected to the lower arm 56. The slide assembly 60 may be of any commercially available construction which precisely controls the relative movement between a shiftable member such as the bar 61 and a fixed member such as the bracket 50.

A low-capacity load cell 62 is connected to the lower surface of the upper arm 54 by means of a screw 64. More specifically, the load cell 62 includes an actuating head 70 which engages the top surface of the slide bar 61. The load cell 62 produces an electrical output which is a function of the loading at the interface between the slide bar 61 and the actuating head 70. Such units generally use a strain gage bridge which produces a linear output voltage in accordance with minute deflections of the actuating head 70. A load cell of the type which can be beneficially used in this invention is Model 3108–10 manufactured by Lebow Associates, Inc. of Oak Park, Michigan. This device has a load capacity of 10 pounds at 0.005 deflection.

In the device thus far described, actuation of the air cylinder 40 shifts the test head 18 to an extended vertical position. In the opposite direction or a retracted vertical position, the head 18 is repetitively stopped at a predetermined position as determined by the adjustable connection between the adjusting nut 46 and the piston rod 44.

The loading assembly 16 generally includes a pair of laterally spaced drive rollers 80 supported on a pair of mounting arms 82 which are pivotally connected to a vertical support block 85 on the mounting bracket 26 by a pivot pin 83. Each roller 80 includes a drive shaft 84 rotatably supported by bearings 86 housed in a bore at the upper end of the mounting arm 82. A gear motor 88 including a planetary gear unit 90 and an electric motor 92 is mounted on the mounting bracket 28. An input drive wheel 94 is coupled to the output shaft of the gear unit 90 and includes resilient ring 96 which engages a pair of output drive wheels 98 coupled to the drive shaft 84.

The relative spacing between the drive rollers 80 is controlled by an adjusting mechanism including adjusting screw 102, a pair of adjusting nuts 104, and a handwheel 106. The adjusting nuts 104 are pivotally attached to the upper portion of the mounting arms 82. The adjusting screw 102 is provided with axially spaced threaded sections of different lands. In assembly, rotation of the handwheel 106 in one direction causes a relative separation of the rollers 80 while rotation in the opposite direction will reduce the distance therebetween. Each drive roller 80 additionally includes an annular groove 110 which is adapted to fittingly engage the inner surface of the seal to be tested.

The test head 18 includes a load wheel or roller 120 connected to a shaft 122 which is rotatably supported on a bracket 124 by a pair of axially spaced roller bearings 126. The upper end of the bracket 124 is connected to the lower end of the slide bar 61 by a fastener 130. The load wheel 120 has a loading surface 132 which is aligned with the axis of reciprocation of the slide bar 61. With this arrangement, the force applied to the loading surface 132 will be directly transmitted through the slide assembly 60 to actuating head 70 of the load cell 62, thereby causing the latter to transmit a force signal directly proportional to the applied force.

The load cell 62 is connected to a load-sensing system which includes an amplifier 140 and a recorder 142. The load cell, as previously mentioned, produces an output force signal 144 which is proportional to the loading on the load wheel 120. This signal is transmitted to the amplifier 140 which amplifies the signal 144 and delivers an output signal 146 to the recorder 142. In the preferred embodiment, the recorder 142 comprises a conventional rectilinear strip recorder which produces an output curve 150 in accordance with output signal 146 and loading on the wheel 120, thereby visually indicating the relative cross section modulus for the tested article.

As previously mentioned, the above-described arrangement is used to measure the force required to deflect a small section of the O-ring 12 to a preset gage length. For a given seal, the drive rollers 80 establish a pair of spaced deflection points 152 and 154 which are separated by a gaging length D, which is generally dependent on the diameter, cross section, and hardness of the sealing member to be tested. The gaging length is preferably selected to produce a measurable low-level stress in the seal cross section so that the prevalent manufacturing irregularities and internal discontinuities, such as, knit lines, entrapped gas, and precured material, which affect static and dynamic qualities, will be reflected on the output curve 150 from the recorder 142.

In operation, the O-ring 12 is tested in the following manner. Initially, the air cylinder 40 is actuated to shift the test head 18 and the drive wheel 20 to a retracted position. The gaging length D is adjusted by means of handwheel 106 to establish a correct deflection for the seal being tested. The O-ring 12 is placed over the drive rollers 80 with the inner diameter thereof resting in the groove 110. Next, the air cylinder 40 is actuated whereupon the load wheel 120 is driven into contact with the outer diameter of the O-ring 12, thereby deflecting the latter to the aforementioned preset length. The gear motor 88 is simultaneously energized to rotate the drive rollers 80 through the drive wheels 94 and 98.

As indicated on the output curve 150, this sequence will establish an initial loading $L_i$ as applied to the load wheel 120. As the seal is rotated, a continuously changing section of O-ring 12 will be steadily driven between the deflection points 152 and 154 and over the load wheel 120. At the same time, the circumferential variations in the modulus of the O-ring 12 will be visually recorded by the recorder 142. Thus, for any given seal, a stress variation C will exist for each measured revolution. For instance, the tested seal may have a localized high-stress area 162 indicating the presence of foreign materials. On the other hand, a localized low-stress area 164 may exist which may represent entrapped gas or precured material. For particular application, the acceptability of a given seal may depend on the uniformity of the test section modulus. Accordingly, acceptance or rejection of the particular seal can be subjectively premised on the extent of the stress variation C and the magnitude of the average loading $L_a$.

Actual tests of the present invention in acceptability and uniformity of seals is determined in accordance with the following conditions:

| | |
|---|---|
| Diameter of the O-ring 12 | 0.210 in. |
| Material of the O-ring 12 | Nitrile rubber |
| Gage length, distance between deflection points 152 and 154 | 0.876 in. |
| Gage deflection | 0.070 in. |
| Acceptable stress levels | Less than 10% of the stress variation c of the average loading $L_a$ |

Although only one form of this invention has been shown and described, other forms will be readily apparent to those skilled in the art. Therefore, it is not intended to limit the scope of this invention by the embodiment selected for the purpose of this disclosure, but only by the claims which follow.

We claim:

1. A test instrument for determining processing and manufacturing uniformity in molded annular elastomeric seals, comprising: a support member; a pair of rollers rotatably supported on the support member, said rollers being relatively spaced so as to engage the inner diameter of the seal to be tested and establish deflection points for the length of said seal therebetween; a load roller carried by said support member for controlled movement relative to the deflection points; means for shifting said load roller with respect to the rollers so as to apply a predetermined deflection to said length of seal and create a measurable low-level stress therewithin; driving means operatively connected to the rollers for dynamically rotating the seal past the load roller; sensing means operatively connected with the load roller for detecting variances in said deflection of the load roller and for creating an output signal in accordance therewith; and indicator means coupled to the sensing means for receiving said output signal and visually indicating the relative stress uniformity of the tested article.

2. A test instrument for determining the product acceptability of O-ring type seals having circular cross sections, comprising: a support stand; a pair of drive rollers rotatably mounted on said support stand; annular grooves on the drive rollers for receiving and drivingly engaging the inner surface of the O-ring to be tested; electric motor means for rotating the drive rollers to impart circumferential movement to the O-ring; a load roller reciprocably supported on said support stand; means for shifting the load roller toward said drive rollers into engagement with the outer surface of the O-ring to thereby load and deflect to a predetermined extent the length of the O-ring between said drive rollers; a load cell operatively connected to the load roller which produces an electrical output signal in accordance with said load and deflection; and recorder means coupled to the load cell for receiving said output signal and producing an output curve in accordance therewith, the variations in the curve being indicative of circumferential internal discontinuities and manufacturing irregularities in the tested article.

* * * * *